United States Patent [19]

Suverkrop et al.

[11] Patent Number: 5,074,435
[45] Date of Patent: Dec. 24, 1991

[54] SYSTEM FOR CONTROLLING THE FEED RATE OF A VIBRATING FEEDER

[75] Inventors: Don Suverkrop, Bakersfield; John A. Cloes, Huntington Beach, both of Calif.

[73] Assignee: Don Suverkrop, Inc., Bakersfield, Calif.

[21] Appl. No.: 532,067

[22] Filed: Jun. 1, 1990

[51] Int. Cl.$^5$ ............................................. B67D 5/00
[52] U.S. Cl. ........................................ 222/55; 222/65; 222/161; 222/164; 241/34; 241/81; 177/50
[58] Field of Search ................ 222/55, 65, 161, 164; 209/242; 241/34, 81; 177/50; 198/524, 535

[56] References Cited

U.S. PATENT DOCUMENTS

| | | | |
|---|---|---|---|
| 1,647,704 | 11/1927 | Lea | 198/502.2 |
| 2,675,120 | 4/1954 | Autenrieth et al. | 198/37 |
| 2,996,261 | 8/1961 | Picalarga | 241/81 X |
| 3,087,652 | 4/1963 | Smith, Jr. | 222/55 |
| 3,117,734 | 3/1964 | McCarty et al. | 241/34 X |
| 3,194,390 | 7/1965 | Allen et al. | 198/220 |
| 3,294,287 | 12/1966 | Went | 222/55 |
| 3,409,235 | 11/1968 | Quinn | 241/76 |
| 3,415,417 | 12/1968 | Steel | 222/55 |
| 3,480,212 | 11/1969 | Liljegren et al. | 241/34 |
| 3,559,846 | 2/1971 | Hastrup | 222/55 |
| 3,581,871 | 6/1971 | Forman | 198/37 |
| 3,897,868 | 8/1975 | Smith, Jr. | 222/55 |
| 3,972,449 | 8/1976 | Smith | 222/64 |
| 3,998,396 | 12/1976 | Umphrey et al. | 241/81 |
| 4,333,394 | 6/1982 | Brown | 100/42 |
| 4,353,796 | 10/1982 | Kubo et al. | 198/535 X |
| 4,565,279 | 1/1986 | Musschoot | 198/505 |
| 4,580,698 | 4/1986 | Ladt et al. | 222/55 |
| 4,729,442 | 3/1988 | Sichet | 177/50 |
| 4,809,880 | 3/1989 | Stein | 222/161 X |
| 4,898,303 | 2/1990 | Large et al. | 222/65 |

FOREIGN PATENT DOCUMENTS

| | | | |
|---|---|---|---|
| 1364706 | 5/1963 | France | 222/55 |
| 304291 | 6/1971 | U.S.S.R. | 241/81 |
| 574626 | 9/1977 | U.S.S.R. | 222/55 |
| 923607 | 4/1982 | U.S.S.R. | 241/81 |
| 983084 | 2/1965 | United Kingdom | 222/55 |
| 1054254 | 1/1967 | United Kingdom | 222/55 |
| 1281036 | 7/1972 | United Kingdom | 222/55 |

Primary Examiner—Michael S. Huppert
Assistant Examiner—Anthoula Pomrening
Attorney, Agent, or Firm—Fulwider Patton Lee & Utecht

[57] ABSTRACT

A system for controlling the feed rate from a vibrating feeder including a device for sensing the amount of materials being discharged from the feeder, an apparatus to change the slope angle of the feeder, and a controller operatively connected to the sensing device and the slope changing apparatus to actuate the apparatus in response to changes in the weight or volume of materials being discharged from the feeder. The sensing device can be connected to a take-away conveyor unit that receives the materials being discharged from the feeder. The slope changing apparatus raises or lowers one end of the feeder to change the slope angle of the feeder while it operates.

25 Claims, 2 Drawing Sheets

SYSTEM FOR CONTROLLING THE FEED RATE OF A VIBRATING FEEDER

BACKGROUND OF THE INVENTION

1. Field Of The Invention

The present invention relates generally to heavy duty machinery used in the mining industry and, more particularly, to a system for controlling the feed rate of a vibrating feeder used in the processing of bulk materials that have been excavated or blasted from pits, quarries and mines. The system is designed to continuously monitor the feed rate of the materials being discharged from the feeder and automatically adjust the slope angle of the feeder to maintain a controlled feed rate which will not exceed the load capacity of downstream conveyor units and other secondary machinery and will prevent unwanted surges that can cause damage to these same units. The invention is also directed to a particular process for controlling the feed rate of a vibrating feeder.

2. Description of the Prior Art

For years, the mining industry has been utilizing both stationary and mobile in-pit processing plants which are capable of on-site processing of bulk materials that have been excavated or blasted from the working face of a quarry, pit or mine. The mobile plants are particularly useful since they are designed to be readily transported within the pit or quarry to follow the progress of the mining operation. The mobility of these plants also permit them to be transported, when necessary, from one job site to another.

A typical mobile plant is usually made up of individual stations which provide a number of different processing operations. Generally, primary crushing or reduction of the bulk materials is the primary concern. For this reason, a primary crushing station which includes heavy duty machinery for crushing larger size rocks into a more manageable size is utilized. The materials coming from the primary crushing station can be transported via conveyor units to secondary stations where further processing can take place. The secondary stations can, for example, further reduce the size of the materials, screen out dirt and fines, separate particular size products, and wash the materials.

The primary crushing station is an important unit on any mining site since it handles the first stage of material reduction. A typical primary crushing station includes a vibrating feeder, a hopper, rock crushing machinery and a take-away conveyor unit. The vibrating feeder includes a carrier pan or trough which handles the materials and feeds the conveyor unit and rock crushing machinery. A hopper is usually placed above the feeder to allow the bulk materials to accumulate and then drop down onto a load receiving region of the pan where vibratory energy imparted to the pan by a motor or other actuating device causes the materials to move along the length of the pan to a discharge region. The pan is usually sloped at a particular angle with the horizontal, called the "slope angle" of the feeder, to allow gravity to help facilitate movement of the materials. The rate at which the materials move along the pan for discharge from the feeder depends upon the amplitude and frequency of the vibration and the particular slope angle of the feeder.

The vibrating feeder may also include a section added to the pan surface that is made from a number of parallel, spaced-apart bars. This section, called a "grizzly" section in the industry, allows under size rocks and materials to fall through the spaces between the bars to a chute that directs the materials to the take-away conveyor located beneath the feeder. Larger size rocks that cannot fall through the spaces between the bars are fed into the rock crushing machinery to reduce their size. The crushed rocks can then be fed onto the take-away conveyor which would also be located near the crushing machinery.

While the primary crushing station operates somewhat efficiently, there are disadvantages associated with it which affects the overall performance and productivity of the unit. The problem stems from the fact that the raw materials that are collected by the front end loaders, quarry trucks, or pit shovels at the work site are heterogeneous, i.e., a combination of materials ranging from fine rock and dirt to large, coarse rocks. The speed at which the raw materials can be processed by the vibrating feeder can vary greatly depending upon the composition of the raw materials and the manner in which the hopper is loaded. For this reason, it is not uncommon for the take-away conveyor or secondary conveyors that transport the materials from the primary crushing station to be overloaded with materials at times and later contain little or no materials.

An uneven feed rate on the take-away conveyor is detrimental to the power source of the conveyor system since it can create surges which strain the power source. An uneven feed rate can also cause the materials to overflow from the conveyor. As a result, conveyor systems have been over designed or oversized to meet the surge possibilities which ultimately results in increased manufacturing and maintenance costs for the conveyor systems. Since long conveyor systems are now being used with primary crushing stations due to the advances in conveyor design and the cost effectiveness of transporting the materials via conveyors rather than by trucks, the overall costs resulting from the over designing of the conveyor systems can be quite high.

One way to effect a more uniform feed rate from the vibrating feeder and reduce the costs attributable to the over design of the conveyor systems is to maintain an operator at the primary crushing station. The operator can control the feed rate to some extent by constantly stopping and starting the machinery depending upon the amount and size of the raw materials that are being loaded into the primary crushing station. The operator can also adjust the feed rate by controlling the amount of material being placed into the hopper. For example, the operator can signal the load operator by a horn, light or other signaling device whenever the material flow to the hopper has to be increased or decreased. However, even an experienced operator can cause uneven feed rates through inattention or inability to estimate the weight of the material being fed onto the take-away conveyor or into the hopper. Further, the manpower needed to continuously monitor the primary crushing station is not cheap and adds to the cost of the mining operations.

The mining industry presently favors a vibrating feeder which utilizes a rotating eccentric weight to generate the vibrations to the feeder pan. This type of feeder is preferred at primary crushing stations due to its ruggedness, longevity, freedom from leakage, low profile, first cost and long term cost effectiveness.

These particular vibrating feeders operate at low frequencies which is most effective for feeding larger stones. The feeder usually operates at a normal operating frequency that is generally above the first natural harmonic. Attempts have been made to create a control system for such feeders which will allow an operator to adjust the speed of the feeder to vary the amplitude or frequency of the vibrations in order to control the feed rate. However, such control systems have not been particularly successful due to the fact that a change in the speed of the feeder may place it at one or more of its natural or harmonic frequencies which is detrimental to the machinery. For the most part, these particular feeders operate best at an optimum speed which is maintained throughout the daily operation. Any control of the feed rate must generally be accomplished by controlling the amount of materials being fed into the feeder hopper or by starting and stopping the feeder. Other ways of controlling the feed rate such as adjusting the eccentric weight to the change the amplitude of the vibration or varying the slope angle of the feeder are not viable alternatives during operation. Once the slope angle and the eccentric weight have been set on the feeder, they cannot be changed once the feeder is operating.

As a result of the disadvantages associated with the rotating eccentric weight type feeders, there is a need for a system for controlling and varying the feed rate of the feeder which still enables it to work at its optimum speed. Therefore, there is a need for a control system that will eliminate all of the above disadvantages associated with this type of vibrating feeder and which will achieve a feed rate that is not detrimental to secondary handling systems.

SUMMARY OF THE INVENTION

The present invention provides a system for automatically controlling the feed rate from a vibrating feeder through the adjustment of the slope angle of the feeder as it operates which causes an incremental increase or decrease of the flow of materials. The system accomplishes the adjustment of the slope angle while the feeder is operating by utilizing a means for moving one end of the vibrating feeder either up or down to change the relative position of the discharge region to the load receiving region of the feeder.

The present invention also includes means for sensing the rate of the materials being discharged from the vibrating feeder. Generally, the materials are discharged onto a separate take-away conveyor unit located beneath the vibrating feeder. The sensing means can be incorporated into the conveyor unit to measure either the weight or volume of materials being discharged from the feeder onto the conveyor. The sensor means is in turn operatively connected with control means which activates the moving means to adjust the slope angle of the feeder as necessary. The control means activates the moving means to directly change the slope angle of the feeder based upon variations in the weight or volume of the materials being discharged onto the conveyor which is continuously being sensed by the sensing means. Thus, if too much material is being discharged onto the conveyor unit, the sensing means will detect this and the control means will actuate the moving means to lessen the slope angle of the feeder. Likewise, if the amount of materials being fed onto the conveyor decreases, the sensing means senses the decrease in weight or volume and the control means actuates the moving means to correspondingly move the feeder to increase the slope angle. At all times, the feeder can be maintained at its optimum operating speed.

The system can also be implemented with crushing machinery that is typically found on a primary crushing station. The vibrating feeder can also include a grizzly section which can separate the undersize rocks before they reach the rock crushing machinery. Since the rock crushing machinery also feeds the crushed materials onto the take-away conveyor, the sensing means will sense the total weight or volume of the materials being fed from the feeder and the crushing machinery and will likewise cause the control means to actuate the moving means to adjust the slope angle if needed.

In a preferred form of the invention, the means for moving the vibrating feeder to adjust the slope angle is made from at least one hydraulic cylinder which supports one end of the vibrating feeder. The opposite end of the vibrating feeder can be pivotally mounted to a support to allow the cylinder to move the feeder up or down as necessary. The hydraulic cylinder can provide total variation in the slope angle which can translate into a substantial feed variation of the normal working rate.

The sensing means can be a device that can sense either the weight or the volume of the materials being discharged onto the conveyor unit. If weight sensing is desired, a device such as a hydraulic load sensing actuator which supports one end of the take-away conveyor unit can be utilized. Alternatively, it volume sensing means is utilized, a device such as a electric switch which detects fluctuations in the height of the materials on the conveyor can be used. The switch can be fixed above the conveyor belt to detect changes in the volume of the material by detecting changes in the height of the pile of materials that are placed on to the conveyor. This volume sensing means would also be connected with the control means to activate the moving means as necessary.

The control system also includes detecting means located on the feeder and the crushing machinery to detect any overflow conditions that can occur within the feeder or crushing machinery. These overflow detecting means can be operatively connected with the control means to deactivate the system if an overflow condition is detected.

From the above, it may be seen that the present invention provides a new and useful system for controlling the feed rate of a vibrating feeder through the adjustment of the slope angle while the feeder is in use. The present system eliminates the need to change the speed of the vibrating feeder to adjust the amplitude or the frequency of the vibration in order to vary the feed rate. When a vibrating feeder of the rotating eccentric weight type is used, the present invention eliminates the need to change the speed of the drive motor thus eliminating the problems that may arise if the natural harmonics of the feeder are reached. As a result, the feed rate of the feeder can be strictly controlled to provide an even flow which eliminates surges in the conveyor systems that transport the material to secondary processing stations or the different locations at the job site. The invention also eliminates the need to overdesign the conveyor systems to meet any undesired surges which results in measured savings in the design and efficiency of the total processing system.

The features and advantages of the present invention will become apparent from the foregoing detailed description taken in conjunction with the accompanying drawings, which illustrate by way of example, the principal of the present invention.

DETAILED DESCRIPTION OF THE PREFERRED EMBODIMENTS

The present invention provides a novel approach in regulating the feed rate from a vibrating feeder through the adjustment of the slope angle of the feeder while the feeder is operating. The present invention eliminates the need to utilize other means to change the feed rate, such as changing the amplitude and frequency of the vibrations on the feeder. As a result, a rather uniform feed rate can be achieved which is beneficial to the take-away conveyor systems that may be utilized with the present invention.

Figure 1:
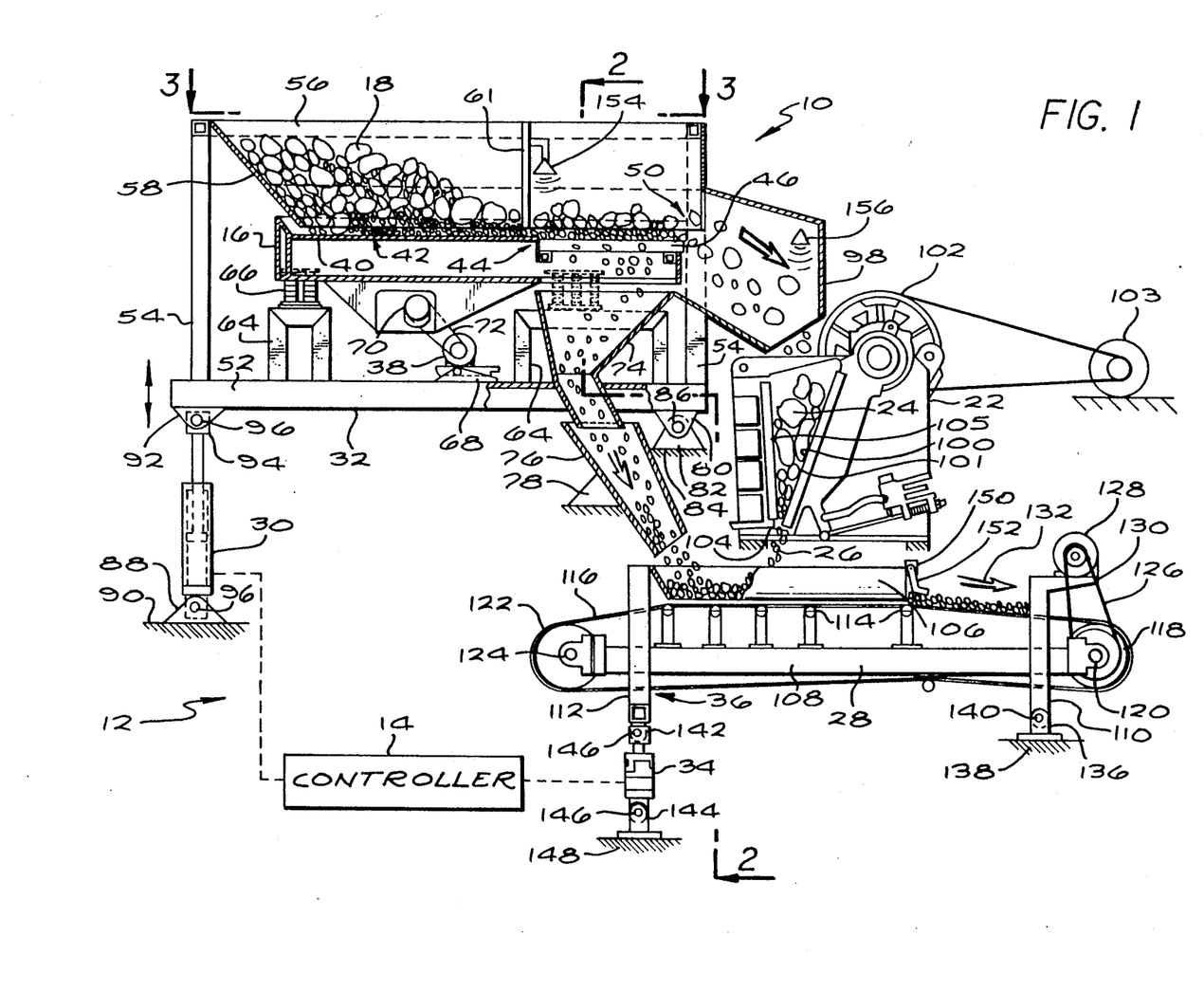
FIG. 1 is a side elevational view with portions partially removed of a vibrating feeder, rock crushing machinery and take-way conveyor system which form a typical primary crushing station that implements a control system made in accordance with the present invention.

FIG. 1 illustrates a general arrangement of the machinery which would constitute a typical primary crushing station (10). A control system (12) made in accordance with the present invention is shown in FIG. 1 in a rather general form. The specific components which make up the control means or controller (14) are shown in greater detail in FIG. 4. The control system (12) will be discussed in general terms with respect to FIG. 1 and will be treated in greater detail below.

Figures 2, 3:
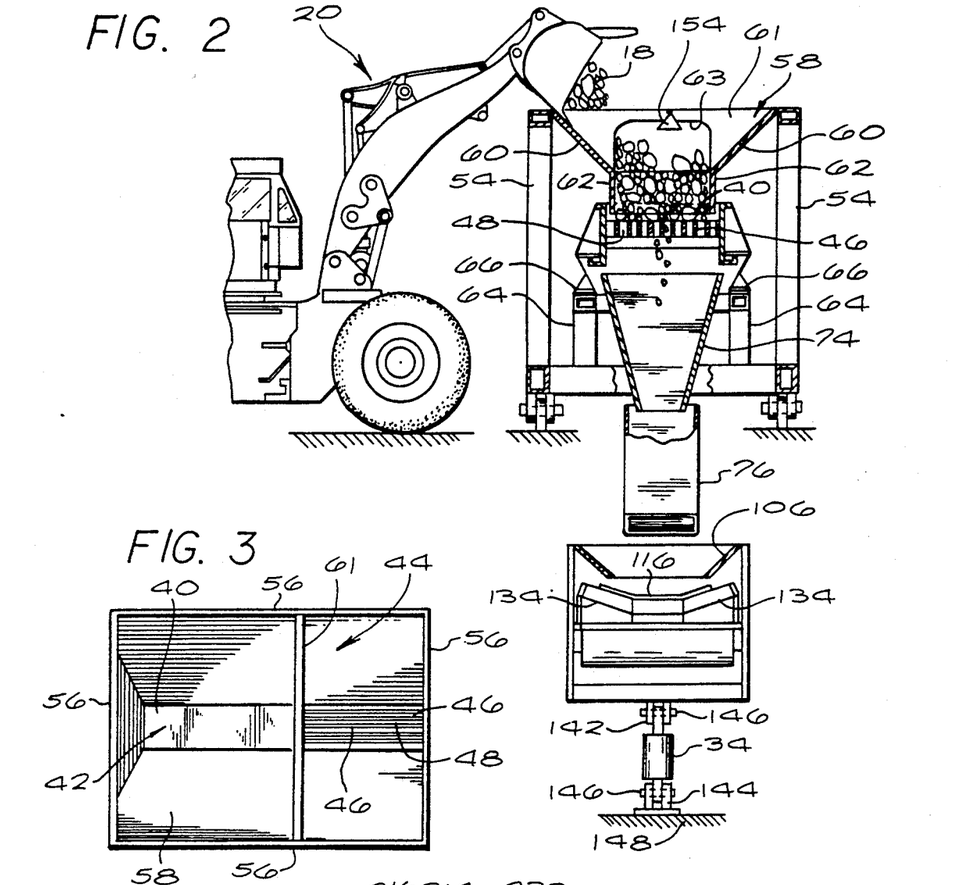
FIG. 2 is a cross sectional side view with portions of the components partially removed of the feeder and conveyor unit shown in FIG. 1 taken along line 2—2 of FIG. 1.
FIG. 3 is a plan view of the vibrating feeder shown in FIG. 1 taken along line 3—3 (with the materials removed to better show the grizzly section).

The primary crushing station (10) includes a representative embodiment of a vibrating feeder (16) utilized to receive raw material (18) from a front end loader, quarry truck or pit shovel that may be utilized in the mining area. FIG. 2 shows a view in which a front end loader (20) places the raw materials (18) into the vibrating feeder (16).

A rock crushing assembly (22) located next to the vibrating feeder (16) receives larger size stones (24) which must be crushed into smaller size stones (26) for processing purposes. The rock materials which are being processed by the vibrating feeder (16) and the rock crushing assembly (22) are shown being discharged onto a take-away conveyor unit (28) located below the feeder (16) and crushing assembly (22). This take-away conveyor unit (28) can transport the processed materials to secondary conveyor systems or to secondary processing stations.

The control system (12) made in accordance with the present invention for controlling the feed rate of the material being discharged from the vibrating feeder (16) includes means for moving the vibrating feeder (16) to adjust the slope angle of the feeder. In FIG. 1, these moving means are shown as a pair of hydraulic cylinders (30) (only one of which is shown in FIG. 1) which support a portion of a frame (32) on which the vibrating feeder is mounted.

The control system 12 further includes means for sensing the weight of the materials being discharged onto the conveyor unit (28). In the form of the invention shown in FIG. 1, this sensing means is shown as a hydraulic load sensing actuator (34) which supports one end (36) of the conveyor unit (28). Both the hydraulic load sensor actuator (34) and the hydraulic cylinders are operatively connected to the controlling means which is shown in FIG. 1 in schematic form as a controller (14) which in operation actuates the hydraulic cylinders to move the frame (32) and vibrating feeder (16) vertically to adjust the slope angle of the feeder. Again, the particular components which comprise the controller (14) are shown in greater detail in FIG. 4 and a description of these components will be described below.

The vibrator feeder (16) shown in FIG. 1 represents a rotating eccentric weight type feeder which utilizes vibratory energy produced by a drive motor (38) to cause the materials (18) to move along the length of the feeder (16). The vibrator feeder (16) includes a carrier trough or pan (40) (also see FIG. 2) which includes a load receiving region (42) and a discharge region (44). The particular vibrating feeder shown in FIGS. 1 through 3 includes a number of spaced parallel bars (46) which forms a grizzly section on the feeder. This particular grizzly section is better shown in FIGS. 2 and 3. Spaces (48) between each bar allow the smaller material to fall therethrough downward to the conveyor unit (28). The larger size rocks that will not fit through the spaces (48) continue along to the end (50) of the grizzly section, where the rocks fall into the rock crushing assembly (22) for crushing purposes.

The frame (32) which supports the vibrating feeder (16) includes a common base (52) which support column members (54). Crossing beams (56) extend from the tops of the column members (54) to form a frame which adequately supports the components affixed thereto. It should be appreciated that portions of the base (52), column members (54) and crossing beams (56) have been removed in FIG. 1 in order to better illustrate other components that are supported by the frame (32).

A hopper (58) is placed over the vibrating feeder (16) to enable raw materials (18) to accumulate therein and drop down onto the pan (40) in the load receiving region (42). The hopper is loosely conformed above the load receiving region to receive the materials that are dropped from the trucks, front end loaders or other equipment used at the mining site. Again, FIG. 2 shows a view in which a front end loader is dumping materials into the hopper (58). The hopper itself includes hopper plates (60) which retains the material and directs the flow of the material between a pair of skirt plates (62) (see FIG. 2) which direct the materials onto the pan (40). The skirt plate (62) forms a loose seal to prevent materials from overflowing the sides of the vibrating feeder. Generally, there is no physical attachment between the skirt plates (62) and the vibrating feeder (16). The hopper (58) itself is affixed to the crossing beams (56) which forms part of the frame (32). The hopper can also include a movable gate (61) which defines an opening (63) to allow the materials to pass to the grizzly section.

The frame (32) also includes machinery supports (64) mounted on the common base (52) to support the vibrating feeder (16). Springs (66) are placed between the machinery support (64) and the feeder (16) to prevent transmission of vibratory energy from the feeder to the support frame. The drive motor (38) is affixed to a bracket (68) located on the common base (52) to drive a v-belt sheave (70) located directly below the pan (40). The motor (38) drives the sheave which is attached to at least one shaft that has weights attached thereto to create the eccentricity that produces the vibrations which are imparted to the pan (40). A belt (72) is used to connect the drive motor (38) to this V-belt sheave (70). It should be appreciated that in FIG. 1, one of the machine supports which supports the vibrating feeder have been removed to better show the components directly behind it.

The frame (32) also supports a primary feeder chute (74) which is located directly beneath the grizzly section of the feeder. This primary chute (74) is used to direct the small rocks and materials that pass through the grizzly section directly to the conveyor unit (28). A second chute (76) can also be utilized to help transport and direct the materials onto the conveyor unit (26). This second chute (76) could be mounted to a support base (78) or other similar supporting structure.

As can be seen in FIG. 1, the portion of the frame (32) directly beneath the discharged region of the feeder is shown to be pivotally mounted to allow the frame to move when the hydraulic cylinders (30) are actuated. In FIG. 1, the frame (32) includes a member (80) which is pivotally affixed to a bracket (82) that is mounted to a support structure (84). A pin (86) or a bearing can be utilized to provide the pivotal relationship between these components. In a similar fashion, the hydraulic cylinder is pivotally attached to a bracket (88) which is attached to a support structure (90). The frame (32) further includes a second projecting member (92) which is pivotally connected to the piston of the cylinder (30). Again, pins (96) or other bearing components can be used to provide the pivotal relationship between these components.

As can be seen in FIG. 1, the larger size rocks which travel along the grizzly section eventually are directed into a chute (98) which feeds the rock crushing assembly (22). This particular chute (98) can also be affixed to the frame (32) or to the crushing assembly.

The rock crushing assembly (22) is shown in FIG. 1 with a portion removed to show the interior crushing chamber (100) which is utilized to crush the larger size rocks. The rock crushing assembly (22) includes a fly wheel (102) which is driven by a motor (103). In the particular crushing assembly shown in FIG. 1, the flywheel (102) helps move a movable jaw (101) towards a stationary jaw (105) to crush the rock found in the chamber (100). It should be appreciated that FIG. 1 shows a general representation of a typical rock crushing machinery. Any suitable form of a rock crusher unit can also be utilized with the other components that make up the primary crushing station.

As is shown in FIG. 1, the crushed material drops from the rock crushing machinery through an opening (104) and onto the conveyor unit (28). Similar materials also drop onto the conveyor unit through the feeder chutes (74) and (76). The conveyor unit itself includes a receiving hopper (106) which helps prevents any possible over flow of materials from the conveyor. The conveyor unit (28) generally includes a frame (108) which is affixed to a pair of vertical support members (110) and (112). The frame (108) in turn supports idlers (114) which are utilized to support the conveyor belt (116).

Referring now to FIGS. 1 and 2, the particular construction of the conveyor unit (28) includes a head pulley (118) that is attached to the front portion (120) of the frame. The conveyor also includes a tail pulley (122) located at the opposite end (124) of the frame. The head pulley (118) is in turn connected via a belt (126) to a drive motor (128) which is supported on an arm (130) formed on the vertical support member (110). The motor (128) drives the head pulley (118) to move the belt and materials in the direction shown by arrow (132).

A portion of the conveyor unit includes troughing idlers (134) (see FIG. 2) which help center the material on the belt (116). The support member (110) is also pivotally mounted to a bracket (136) affixed to the ground or a support structure (138). Again, a pin (140) can be used to allow the components to pivot as necessary. The other vertical support member (112) is supported by the hydraulic load sensing actuator (34) which forms part of the control system. As can be seen in FIGS. 1 and 2, this particular actuator (34) is also pivotally attached to a pair of brackets (142) and (144) to allow for pivotal movement. Pins (146) again provide for pivoting action. The bottom bracket is mounted on the ground or to a supporting structure 148.

In operation, the conveyor belt (116) is driven at a constant speed and carries the entire material load passing from the vibrating feeder and the rock crushing machinery. The particular arrangement of the hydraulic actuator with the conveyor will provide an indication of the feed rate of the material in terms of mass per unit time. It should also be appreciated that the embodiment shown in FIGS. 1 and 2 shows a hydraulic actuator used to sense the weight of the material on the conveyor. However, any number of sensing devices could be utilized to impart a signal either electrically, hydraulically or pneumatically to indicate variations in the weight of the materials being fed onto the conveyor. Similarly, the sensing device does not necessarily have to support the conveyor unit as is shown in FIGS. 1 and 2. It could also be located above the conveyor unit and attached to an upper support member to likewise sense the weight of the material being fed onto the conveyor. Any number of different arrangements are possible for this actuator along with the means used to move the vibrating feeder to change the slope angle of the feeder. For example, powered screw jacks or other known equipment can be used to move the frame and vibrating feeder as necessary to adjust the slope angle. Also, the hydraulic cylinders need not be necessarily placed at the receiving end of the feeder but could be placed beneath the discharge end of the feeder to raise or lower the discharge end as needed. Again, a number of different combinations are possible utilizing the components that make up the present invention.

Referring again to FIG. 1, another type of sensing means is shown as an electrical switch (150) which is located above the conveyor unit (28) and is utilized to sense the volume of materials that are being fed onto the conveyor. The electrical switch (150) includes a downwardly extending flap (152) which comes in contact with the materials that move along the conveyor unit. The electrical switch (150) and flap (152) sense the changes in the volume of the material being discharged onto the conveyor unit from the vibrating feeder and rock crushing assembly by sensing changes in the height of the materials that are placed on the conveyor belt. Whenever the volume of materials increases or decreases, the height of the materials on the conveyor belt will also correspondingly increase or decrease. As a result, the electrical switch (150) can be utilized to detect volumetric changes that may occur and can likewise be operatively connected with the control means to actuate the moving means as necessary to increase or decrease the slope angle of the feeder.

It should be appreciated that the means used to sense changes in the volumetric rate can be any one of a number of different sensing devices which can detect changes in the height of the processed materials. For example, photosensitive electric sensors can be placed along the conveyor unit to determine fluctuations in the height of the materials being discharged onto the conveyor unit. Other devices include sonar units and other and similar type sensing devices which are known in the art. Again, these particular sensors would also be operatively connected with the control system to activate the moving means as necessary to change the slope angle of the feeder.

The control system also includes detecting means located on the feeder and the crushing assembly to detect overflow conditions or jam ups which can occur during operation. Referring again to FIG. 1, a detecting sensor (154) is shown attached to the movable gate (61) located in the hopper (58). The sensor (154) is designed to detect the volume of the materials being discharged past the gate (61) by measuring the height of the materials. In the particular embodiment shown in FIG. 1, the sensor (154) can be a sonar sensor which detects the height of the materials within the grizzly section.

A second detecting means shown as a sensor (156) is located within the chute (98) which feds the rock crushing assembly (22). This sensor (156) can again be a similar sensor as the one shown above the grizzly section of the feeder. This sensor (156) is utilized to detect overflow conditions within the rock crushing assembly by again sensing or detecting the volume of materials that are being accumulated within the crushing assembly and chute (98). The sensor can again be a sonar device or any other means which can be utilized to detect volumetric changes by measuring the height of the materials which accumulate in the chute and crushing assembly.

In operation, it is always possible that rocks can be placed into the hopper which are too large to fit through the opening (63) of the gate (61) of the hopper. When this occurs, the larger sized rocks can block the opening and cause a condition known as "bridging" which prevents other materials from flowing through the feeder. As a result of this condition, the materials will back up until the blockage is cleared by an operator. When bridging occurs, the system will detect a decrease in the amount of materials being discharged onto the conveyor unit and will correspondingly increase the slope angle to attempt to generate an increased feed rate. However, an increase of the slope angle will not usually dislodge the oversize rocks no matter how high the feeder is raised. The detecting sensor (154) is thus designed to detect volumetric flow changes occurring directly in the grizzly section of the feeder and will shut off the system in the event that the increase in the slope angle fails to increase the flow rate into the grizzly.

Likewise, the second detecting sensor (156) will also detect any bridging that may occur between the stationary and movable jaws of the rock crushing assembly. There is always a possibility that a large rock could possibly wedge itself between the jaws of the crusher and cannot be crushed or moved properly due to its size. The bridging condition that can occur within the rock crushing assembly will cause a back flow of materials to accumulate either within the chute (98) or within the crushing chamber (100) of the crusher. The sensor (156) will detect an increase in the volume of material within the chute and/or chamber and will likewise shut off the system to allow the blockage to be cleared. Both sensors (154) and (156) are operatively connected to the control system and can also be connected to an alarm such as a horn or flashing light (not shown) to alert workers at the site that there is a blockage of materials either in the feeder or rock crushing assembly. A worker can then proceed to clear the blockage and restart the machinery.

Figure 4:
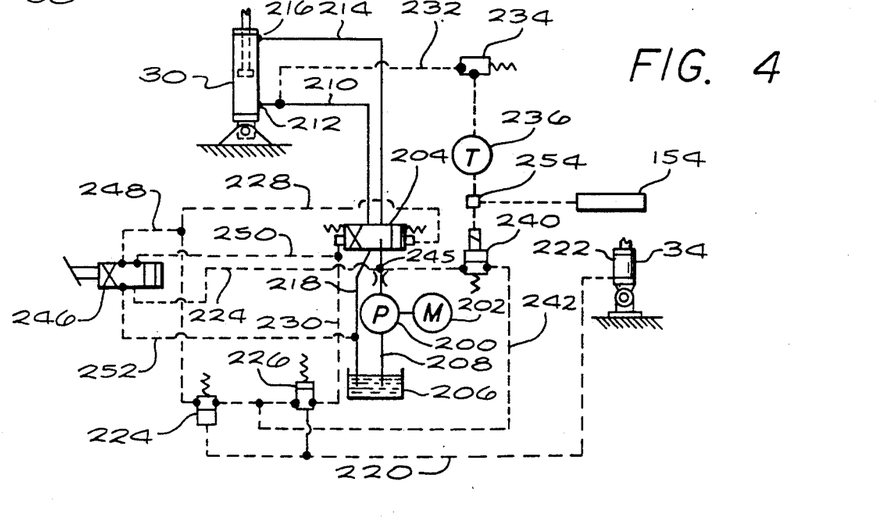
FIG. 4 is a schematic diagram of the control system made in accordance with the present invention.

Referring now to FIG. 4, the specific components that make up the controlling means which forms part of the control system is shown in greater detail. The control system can be made for many different types of components, but the system shown and described herein uses hydraulic components since hydraulic cylinders and actuator are used as the prime moving force and sensing device.

A hydraulic pump (200) driven by a motor (202) supplies hydraulic fluid under pressure to a master hydraulic control valve (204) which acts as the chief component in actuating the hydraulic cylinders. This master control valve (204) can be a spring centered, pilot operated, four way valve having cylinder ports closed in the neutral position. The pump (200) which supplies the fluid to the master valve (204) is supplied by a reservoir (206) which has a sufficient amount of hydraulic fluid to operate the components making up the control system. A main hydraulic line (208) runs from the reservoir (206) to the pump (200) and likewise to one of the ports of the master valve (204).

The master control valve (204) has one cylinder port connected to a hydraulic line (210) which is in turn connected to a piston port (212) located the hydraulic cylinder. A second cylinder port is connected to another main hydraulic line (214) which is in turn connected to the rod end port (216) of the hydraulic cylinder. The remaining cylinder port of the master valve (204) is attached to a main hydraulic line (218) which leads to the reservoir (206).

The main hydraulic system described above is controlled through components that are actuated by pilot pressure in the system. The hydraulic load sensing actuator (34) has a pilot line (220) extending from a port (222). This pilot line (220) is in turn connected to a pair of pressure operated valves (224) and (226). These valves 224 and 226 may be spring return, two way, pilot pressure operated valves which are in turn connected to the master valve (204). As can be seen in FIG. 4, pilot line (228) extends from the valve 224 to the master valve (204). The other valve (226) is in turn connected via a pilot line (230) to the master valve (204).

The main hydraulic line (210) is connected to a pilot line (232) which is also connected to an adjustable electric pressure switch (234) which actuates, when pressure is sufficiently high, an electric timer (236). This electric timer (236) is in turn operatively connected to a solenoid valve (240) that can be opened to transmit pilot operating pressure to either end of the master valve (204). Pilot lines (242) and (244) connect the hydraulic pressure from pump (200) into the control system. As can be seen in FIG. 4, pilot line (244) is connected to the main line (208) via a connector (245). The electric timer (236) is designed to adjust the frequency and duration during which the solenoid operated valve 240 can be opened in order to avoid "hunting" effects and "over correction" of the control system. The specific function of the timer will be further described below.

A manually operated valve 246 which can be located at an operator's control station provides a manual means for preliminarily setting the slope angle of the feeder. This manual valve (246) operates as an over ride to manually control the system. Pilot lines (248) and (250) connect valve (246) to the pilot pressure system while line (252) returns hydraulic fluid to the reservoir (206).

The particular control means shown in FIG. 4 shows just one system of components that can be employed when a hydraulic load sensor actuator (34) is utilized in accordance with the invention. In other embodiments of the invention, an electric load sensing device may be utilized without departing from the spirit and scope of the invention. In such embodiments, the system shown in FIG. 4 would have to be modified since the sensing means would no longer be directly connected to the hydraulic pilot control system. Rather, the valves (224) and (226) would be replaced by solenoid valves which would be electrically connected to the electrical load sensing device which would take the place of the hydraulic actuator (34). The electrical device would send electrical signals to the solenoid valves to allow the valves to open and close as required in order to control the pilot control system.

In the same respect, when volume sensing means are utilized, such as the electrical switch (150) and flap (152), shown in FIG. 1, the switch would be electrically connected into the control system via the solenoid valves that would replace valves (224) and (226). It should be appreciated that either weight sensing or volume sensing devices can be utilized in accordance with the present invention and that the components that make up the control means can be modified from the system that is shown in FIG. 4 and still be within the scope and spirit of the invention.

The detecting sensors (154) and (156) can likewise be operatively connected into the system as is shown in FIG. 4. In FIG. 4, only one detecting sensor is shown connected into the system. However, both sensors can be easily connected into the system. In this form of the system, an electric switch (254) can be connected between the timer (236) and solenoid valve (240) to shut off the system when an overflow condition is sensed by the detecting sensors (154) and (156). This switch (254) would be operatively connected with the detecting sensors and can also be connected to visual or audio alarms that will alert workers in the area of a blockage.

In the field, operation of the control system is initiated by providing power to all machinery. An operator can then utilize manufacturing data relating to the feed rate for the particular vibrating feeder to adjust a preliminary slope angle for the feeder. The pair of pressure valves (224) and (226) also have to be adjusted based upon an engineering analysis. The system is designed so that the high limit pressure to activate valves (224) against the spring pressure and the low limit pressure at which the spring of valve (226) overcomes the reduced pressure to activate the pilot flow from valve (226) will be established based upon a predetermined material flow rate usually in tons per hours or kilograms per second. The operator also preliminarily sets the timer (236).

As the machinery becomes operative, material will be dumped into the receiving hopper for placement on the vibrating feeder. The operator will initially observe the feed rate of the material passing away from the primary crushing station on the take-away conveyor (28). At such time as the bed depth of material passing over the pan appears to be suitable for the size of the quarried materials, and the desire feed rate is obtained, the operator can then adjust the activation pressure of pressure switch (234) to start the timer (236). The timer (236) will momentarily apply pressure to both valves (224) and (226). Once the feed rate of material on the conveyor unit (28) is set, the hydraulic load sensing actuator (34) will sense any excessive pressure resulting from an increase of the feed rate from the feeder. The resulting high pressure coming from port (222) will overcome the spring pressure at valve (224) and admit the pilot pressure to the pilot pressure port located at the right hand of the master valve (204). This will admit pump flow to the upper port (216) of the hydraulic cylinder (30) and release fluid from port (212) to the reservoir. The load receiving end of the feeder will then be lowered and the feed rate of material will thus be reduced.

Conversely, should the feed of the materials onto the conveyor unit (28) become too small, then the pressure acting on the hydraulic load actuator (34) will be less than normal. Such low pressure will allow the spring force at valve (226) to overcome the pilot pressure in line (220) and will admit pilot pressure to the pilot pressure port at the left end of the master valve (204). This will admit pump flow to the bottom port (212) of the hydraulic cylinder (30) and will release fluid from the upper port (216) to the reservoir (206). The load receiving end of the feeder will then be raised and the feed rate of the materials will increase.

The timed duration of these corrective actuation is limited by the timed flow permitted by the solenoid operated valve (240). A brief interval of time is provided by the timer (236) to allow the system to stabilize for each new condition.

In the event that the detecting sensors (154) and (156) senses an overflow or bridging during operation of the system, the system will automatically shut off in order to prevent the slope angle from being increased any further until an operator can inspect the machinery and clear any blockage. Once the machinery is cleared of any obstructions, the system can then be restarted for continued operation.

The components which make up the present invention can be obtained commercially as they are well known components in the art. Vibrating feeders are made by a number of domestic companies and may be a simple pan feeder or it may include one or more grizzly sections to allow for screening of particular size products.

The crushing machinery or assembly used in accordance with the present invention again can be made from any number of different types of crushers which are commercially available. The conveyor unit shown and described above is simply representative of a number of conveyor systems that could be utilized at a primary crushing station. Of course, it should be appreciated that different types of conveyors units could be utilized without departing from the spirit and scope of the present invention.

The frame utilized to support the vibrating feeder can be manufactured from structural steel or other similar suitable material. The hydraulic cylinders and hydraulic load sensing actuators must of course be of a proper size to handle the weight of the system and the materials that will be handled by the unit.

From the above, it is evident that the present invention provides a novel system for controlling the feed rate from a vibrating feeder which eliminates many of the problems associated with uneven feed rate. The system is superior since the slope angle of the feeder can be varied while the feeder is operating. While particular forms of the invention have been described and illustrated, it will also be apparent to those skilled in the art that various modifications may be made without departing from the spirit and scope of the invention. Accordingly, it is not intended that the invention be limited, except by the appended claims.

We claim:

1. In a combination of a vibrating feeder for conveying materials including a carrier pan having a load receiving region and a discharge region, means for vibrating the pan to move the material from the load receiving region to the discharge region, the pan being set at an angle with the horizontal to facilitate the movement of the material, and a conveyor unit which receives the material being discharged from the feeder, the improvement comprising:
   a system for controlling the feed rate of materials from the feeder including:
   means for moving the feeder to change the angle between the carrier pan and the horizontal;
   means for sensing an amount of the materials that are discharged onto the conveyor unit; and
   control means operatively connected with said moving means and sensing means for actuating said moving means in response to changes in the amount of materials being sensed by said sensing means.

2. The improvement of claim 1 wherein said sensing means comprise means for sensing the weight of the materials being discharged onto the conveyor unit.

3. The improvement of claim 1 wherein said sensing means comprise means for sensing the volume of materials being discharged onto the conveyor unit.

4. The improvement of claim 1 wherein said moving means is adapted to move the load receiving region relative to the discharge region to change the angle between the carrier pan and the horizontal.

5. The improvement of claim 1 wherein said control means including means for temporarily delaying the actuation of the moving means in response to the amount of materials being sensed by said sensing means.

6. The improvement of claim 1 wherein said moving means comprise at least one hydraulic cylinder adapted to move said vibrating feeder.

7. The improvement of claim 6 wherein said sensing means comprise a hydraulic load sensing actuator.

8. The improvement of claim 3 wherein said sensing means comprise a switching device adapted to sense changes in the height of the materials being conveyed by the conveyor unit.

9. The improvement of claim 2 further including means for sensing the volume of materials being conveyed by the conveyor unit.

10. In a combination of a vibrating feeder for conveying materials including a carrier pan having a load receiving region and a discharge region, means for vibrating the pan to move the material from the load receiving region to the discharge region, the pan being set at an angle with respect to the horizontal to facilitate movement of the materials, a crushing machinery for receiving at least a portion of the material being discharged from the vibrating feeder for crushing the same, and a conveyor unit which receives the material being discharged from the feeder and the crushing machinery, the improvement comprising:
   a system for controlling the feed rate of materials being discharged onto the conveyor unit including:
   means for moving the feeder to change the angle between the carrier pan and the horizontal;
   means for sensing an amount of materials being discharged onto the conveyor unit from the vibrating feeder and crushing machinery; and
   control means for actuating said moving means in response to the amount of materials being sensed by said sensing means.

11. The improvement of claim 10 wherein said sensing means comprise means for sensing the weight of the materials discharged onto the conveyor unit from the feeder and crushing machinery.

12. The improvement of claim 10 wherein said moving means is adapted to move the load receiving region relative to the discharge region to change the angle between the pan and the horizontal.

13. The improvement of claim 10 wherein said sensing means comprise means for sensing the volume of materials being discharged onto the conveyor unit.

14. The improvement of claim 10 further including means for detecting the volume of materials being discharged from the discharge region of the feeder.

15. The improvement of claim 10 further including means for detecting the volume of materials within the crushing machinery.

16. A system for controlling the feed rate of a vibrating feeder used for conveying materials which includes a carrier pan having a load receiving region, the pan being set at an angle with respect to the horizontal for facilitating movement of the materials, comprising:
   means for moving the vibrating feeder to change the angle between the carrier pan and the horizontal;
   means for sensing an amount of the material being discharged from the vibrating feeder; and
   means for controlling the actuation of the moving means in response to the amount of materials being sensed by said sensing means.

17. The system of claim 16 further including means for conveying the materials being discharged from the vibrating feeder, said sensing means being operatively connected to said conveying means for sensing the amount of the materials being placed upon said conveying means.

18. The system as defined in claim 17 wherein said moving means comprises at least one hydraulic cylinder adapted to move the vibrating feeder to change the angle between the carrier pan and the horizontal.

19. The system as defined in claim 17 wherein said sensing means comprises a hydraulic load sensing actuator.

20. The system as defined in claim 17 wherein said control means comprises hydraulic components.

21. The system as defined in claim 17 wherein said sensing means comprise means for sensing the weight of the materials being discharged from the vibrating feeder.

22. The system as defined in claim 17 wherein said sensing means comprise means for sensing the volume of materials being discharged from the vibrating feeder.

23. A process for controlling the feed rate of a vibrating feeder used for conveying materials which includes a carrier pan having a load receiving region and a discharge region, means for vibrating the pan to move the material from the load receiving region to the discharge region, the pan being set at an angle with respect to the horizontal to facilitate movement of the material, comprising the steps of:
- continuously sensing the amount of materials being discharged from the vibrating feeder;
- providing a signal when the amount of the discharged material varies from a predetermined value; and
- moving the vibrating feeder to change the angle between the pan and the horizontal in response to any variation of the amount of the materials being discharged from the vibrating feeder.

24. The process of claim 23 wherein the sensing step is accomplished by continuously sensing the weight of the materials being discharged from the feeder.

25. The process of claim 23 wherein the sensing step is accomplished by continuously sensing the volume of the material being discharged from the feeder.

* * * * *